(12) United States Patent
deLa Torre Bueno

(10) Patent No.: US 8,189,882 B2
(45) Date of Patent: May 29, 2012

(54) AUTOMATED LASER CAPTURE MICRODISSECTION

(75) Inventor: Jose deLa Torre Bueno, Vista, CA (US)

(73) Assignee: Clarient, Inc., Aliso Viejo, CA (US)

( * ) Notice: Subject to any disclaimer, the term of this patent is extended or adjusted under 35 U.S.C. 154(b) by 1131 days.

(21) Appl. No.: 12/022,750

(22) Filed: Jan. 30, 2008

(65) Prior Publication Data
US 2009/0190820 A1   Jul. 30, 2009

(51) Int. Cl.
*G06K 9/34* (2006.01)

(52) U.S. Cl. ........ 382/128; 382/173; 382/180; 382/181; 382/190; 382/199

(58) Field of Classification Search .................. 382/128, 382/130, 131, 173, 180, 181, 190, 199; 128/920, 128/922
See application file for complete search history.

(56) References Cited

U.S. PATENT DOCUMENTS

| 2004/0093166 A1* | 5/2004 | Kil .................................. 702/19 |
| 2005/0002552 A1* | 1/2005 | Dunn et al. .................... 382/133 |
| 2007/0029462 A1* | 2/2007 | Perz et al. ................... 250/208.1 |
| 2009/0091566 A1* | 4/2009 | Turney et al. ................. 345/419 |

* cited by examiner

*Primary Examiner* — David A Vanore
*Assistant Examiner* — Nicole Ippolito

(57) ABSTRACT

Multiple different samples are obtained from a bulk material and are separately stained. The differently stained materials look different with the different stains but also have similar characteristics. A computer is used to reorient the images so that the samples are oriented with one another. The thus oriented samples can have their like parts either reoriented. Once the stained areas are analyzed, the identified area in the unstained sample can be removed by laser capture microdissection.

9 Claims, 2 Drawing Sheets

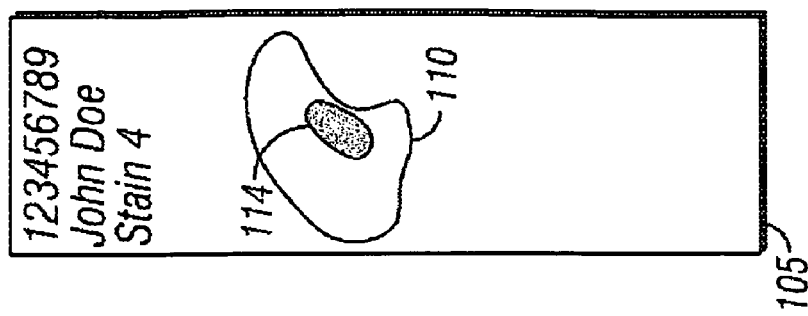
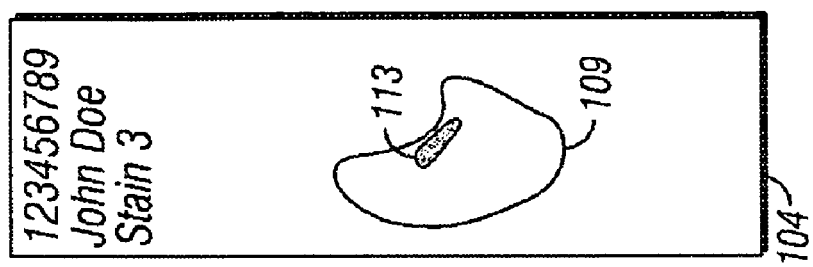
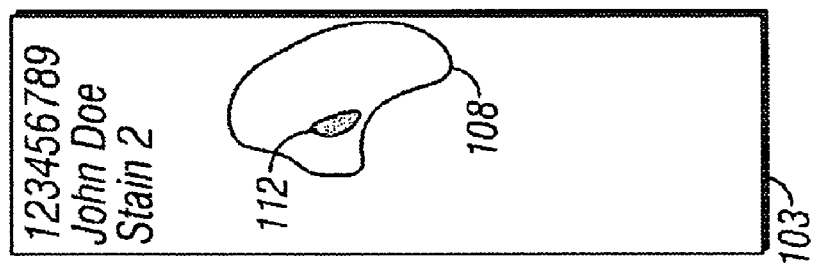
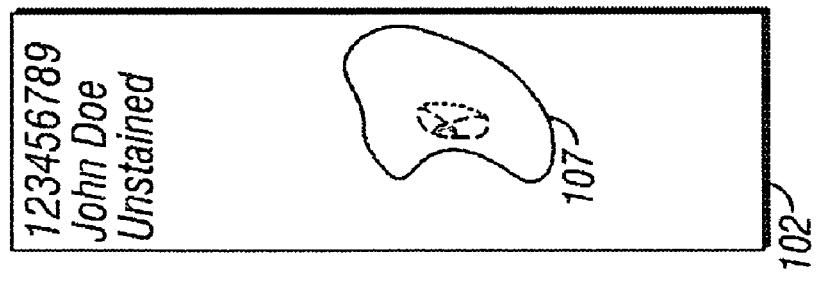
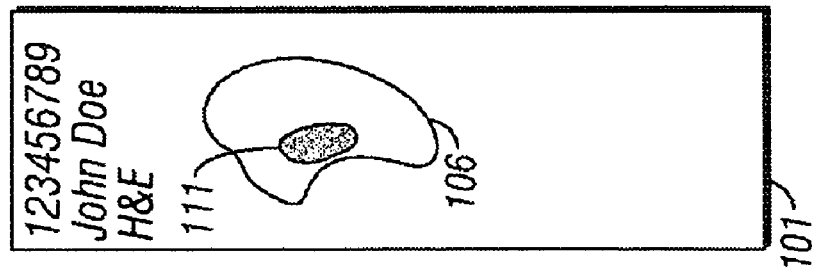

AUTOMATED LASER CAPTURE MICRODISSECTION

BACKGROUND

Different techniques can be used to characterize pathology samples such as tumors. One of such techniques investigates homogenized samples and determines information from the homogenized sample, e.g., within a test tube, and the other collects spatially orientated information.

Homogenized tissue sample tests can test for different characteristics. However, the whole contents of the test tube is averaged for the test. Tests of these types include polymerase chain reaction or PCR, Western blotting that can be used to quantify concentrations of types of proteins in a sample, DNA arrays, that can be used to quantify the amount of DNA in sequences, RNA arrays that can be used to quantify messenger RNA and thus determine the expression level of many different genes, and others. These kinds of tests can be very specific—for example, quantitative PCR can be used to determine the level of PCR differing by only a single mutation. However, the specificity is reduced since the test is specific to the entire sample.

Staining techniques can also be used. In slide based tests the sample is sectioned into thin sections (typically 5 microns) and placed on a microscope slide for observation with a microscope, photo microscopy or image analysis. Stains are used on the tissue to make certain features visible. One stain is the classic H&E stain. This stain allows pathologists to view the overall morphology of a tissue and identify areas of tumor based on morphological features that show up under the stain. Other stain techniques produce other results. For example, IHC (Immunohistochemistry) creates and links custom antibodies to proteins or other chemical species on a stain. IHC can be used to visualize contents of a slide to determine that a target molecule is present. IHC can also be used to specify which cells or even sub cellular structures in which the target molecule is present. By using several stains linked to different antibodies, it is possible to characterize the extent of co-localization of several targets or determine that they are found in different cells or organelles.

FISH (Fluorescent in-situ hybridization) can locate the position on a chromosome of a given genetic sequence by using several probes linked to different colored dyes. Fish makes it possible to see the spatial relationship of different loci. For instance FISH can be used to detect chromosome translocation that cause leukemia by marking two loci known to be brought together by a translocation that causes leukemia with red and green fluorochromes. If the translocation has occurred, these 2 probes will be brought next to each other and will appear to be a single yellow dot. Thus FISH can produce detailed spatial data on the location of gene sequences.

In general, the operation on homogenized tissue make many measurements but are in effect averaging over the entire block that was homogenized. This has limited their utility in practical diagnosis because the tissue sample delivered to a pathologist is rarely entirely cancerous. In cancer surgery, the goal is to remove tissue until the margins are clear (that is free of cancer). In biopsy samples, there is often no way to assure that only tumor is sampled. Further, it is known that many cancers are themselves genetically and metabolically heterogeneous. This means that the numbers produced by all of the homogenization methods may be averages of tumor and non tumor tissue or different regions of the tumor.

Slide based methods overcome the localization limitations but suffer from restrictions on the number of chemical species that can be detected at once. While DNA arrays can test for thousands of sequences at once, FISH is restricted to 4 or 5 probes at a time. Similarly IHC is limited by the number of stains that can be attached and visualized, e.g., 3 or 4.

These limitations mean that in practice it is possible to know the amount of various types of DNA, RNA and protein in a tissue in detail but not the precise location of those species or it is possible to know the location of a few species with high spatial accuracy.

Other techniques collect spatially oriented information from slides. Laser capture microdissection, for example, uses a laser to release a chosen section of the tissue, e.g. while observing the tissue on a slide under a microscope (with no cover slip). The released sample is captured in a vial, and the localized sample is tested using one of the methods mentioned above. This allows obtaining test information for a known location. While this is difficult at the sub cellular level, it is possible to select one or a few cells that are known to be part of a tumor.

Laser capture microdissection has not been widely used because of its disadvantages. One is the cost and complexity of the equipment involved. Also, since the sample is collected after it has been fixed and possibly stained these processes may disrupt the target molecules and prevent some chemical methods from operating correctly. Also, since the size of the area sampled is inherently limited by the collection technique, it may be too small relative to the tumor that is to be characterized.

SUMMARY

The present application describes using image analysis in conjunction with laser microdissection to automatically determine areas within the sample.

BRIEF DESCRIPTION OF THE DRAWINGS

In the drawings:
FIG. 1A-1E show multiple slides sections.

DETAILED DESCRIPTION

Figure 2:
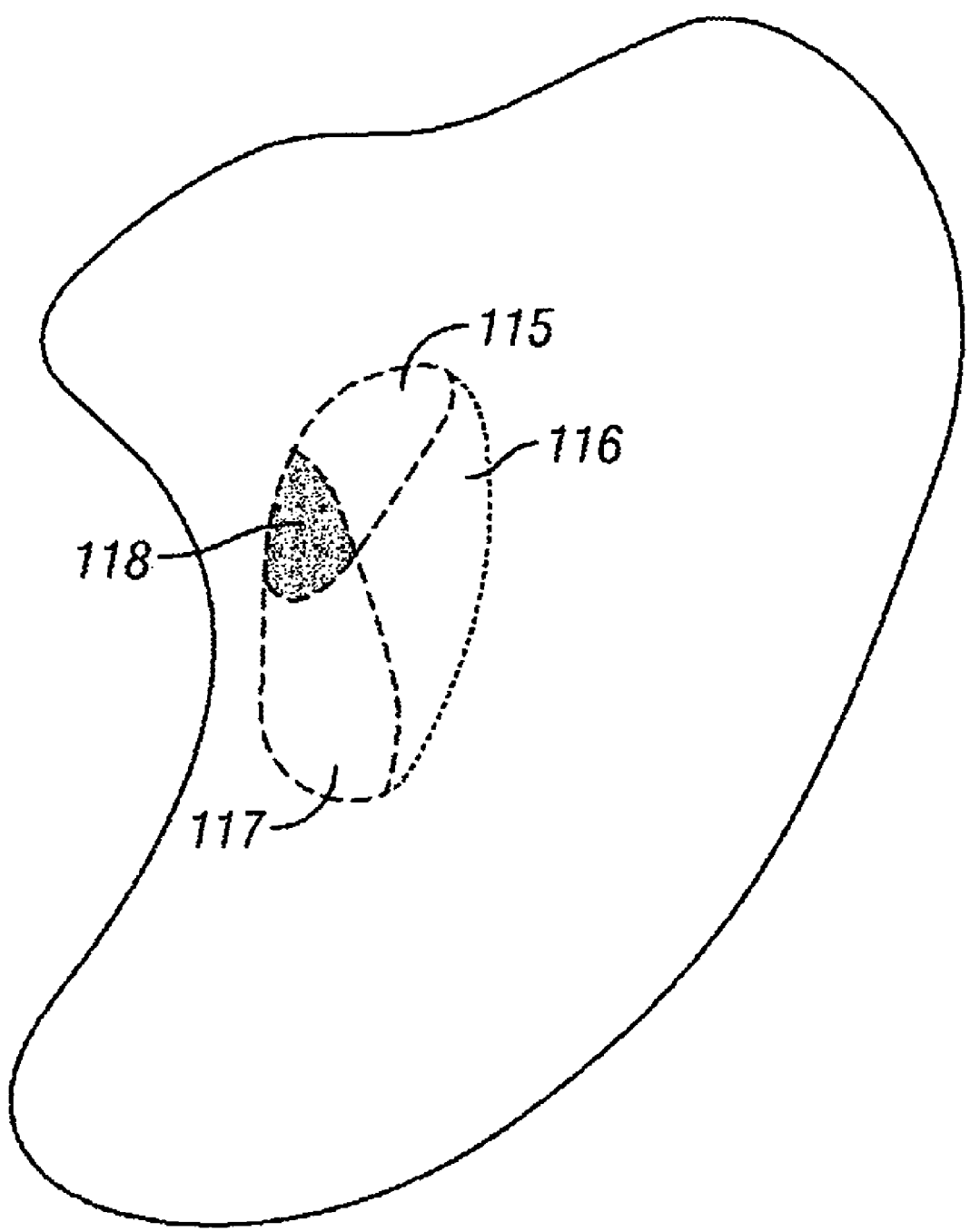
FIG. 2 shows a composite slide section.

When carrying out laser capture microdissection, one is faced with a tradeoff. One typically processes the unstained slides, to avoid effects from the staining and fixing of the slide portions. However, it is often difficult to determine items of interest (e.g. tumors) from the unstained slides within those sections. Therefore, it is very time consuming and labor intensive. Many laser microdissection users attempt to identify the areas of interest within the untreated slide. This adds to the difficulty of determining the area.

The inventors recognize that usually when slides are taken, they are serial cut sections, cut from a block, about 4 microns apart, into a water bath. The sections are then pulled from the water bath, and may be in random locations on the slide. However, the serial sections have similar information.

Multiple serial sections are obtained. One section, or more preferably plural sections, are stained using different staining techniques. Another section/slide is unstained.

An interesting area is identified on one or multiple stained sections. For example, FIG. 1A illustrates a stained section 111. Other techniques may be used, including manual drawing or automated image analysis to mark the interesting region.

Shape analysis of the shapes, e.g. 106, within slide 101 is then used to project one slide image 106 on top of another image 108. These multiple serial sections are rotated and superimposed onto one another. The multiple stained sections can be rotated and superimposed on to an unstained section. The staining can be used to determine which regions are interesting. The determination can be automated, or it can be done remotely, for example by drawing on the screen. This avoids certain labor-intensive parts of the laser microdissection. The sections which are shown to be interesting by the stain are then translated into the unstained image. This can be used to form rules for guiding the laser by studying the stained sections, and then to use them on the unstained sections.

The area determination and orientation can identify an area, and once identified, the outline or whole image is correlated with another area. A similarity measure can be carried out by cross correlation, which rotates and translates across every possible rotation and translation value, and finds similarity values at each relative orientation (e.g., using least mean squares measures). The closest match is used as a final match. This allows each tissue level feature to be accurately matched from a region on one slide to another slide.

FIG. 1A-1E illustrate an embodiment. A number of different sections are shown in FIGS. 1A, 1B, 1C, 1D and 1E. Each of these sections are serial sections from the same area. The section from FIG. 1A has a stained area 111 which is stained with a first stain, here H&E. FIG. 1C shows another serial section 103 stained with a second stain, showing a second stained area 112. Section slide 104 shows a third stain and a third stained area 113. Slide 105 shows a fourth stain, and a fourth stained area 114.

Slide 102 is unstained. All of the stained areas are transposed and superimposed on the non-stained area 107. FIG. 2 illustrates a closeup view of the unstained slide 102, in which all of the stained areas 111, 112, 113 and 114 are shown. Laser capture microdissection can be used for any of these areas. Each area has been projected onto the unstained slide. Area 115 is a projection of 112 onto area 107 taking into account translation and rotation between 108 and 107. In a similar way, 116 is a projection of 111; 117 is a projection of 113, and 118 is the intersection of the different stained regions. This allows a number of different stains to each be individually used on different slides. The system determines the translation and rotation between the areas, and uses that same translation and rotation to translate and rotate the slide. The intersection area may be used to identify, for example, areas of interest that are viewable only when stained with multiple stains.

In the embodiment, the unstained slide is the one that is actually laser microdissected. In the embodiment, the unstained slide is between multiple stained slides. In this way, the slide that is microdissected is serially between stained slides, preferably in the middle of the sections. In this way, the dissected slide is between the other slides and forms a median of the other slides.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other data formats, other kinds of slides, etc, may be used.

The term serial means that the different sections are formed in series, but includes a situation where there are unused slides between the serially obtained sections. Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers that carry out the processing described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method comprising:
obtaining multiple serial sections of sample material from a bulk sample;
staining at least two of said sections using different stains for each section;
obtaining images of said sections;
reorienting at least one image of said at least two sections that has been stained to overlap with that of at least one other section that is unstained using a computer; and
using said at least two sections that has been stained to determine a location on said at least one other section to carry out laser microdissection;
wherein the unstained section is in-between the stained sections.

2. A method as in claim 1, wherein said using comprises forming instructions that automatically control laser microdissection using a computer.

3. A method as in claim 1, wherein said using comprises remotely determining an area of interest from a remote location, and returning, from the remote location, information about the area of interest.

4. A method as in claim 1, wherein said reorienting comprises carrying out crosscorrelation through a plurality of different rotations and translation values, and finding similarity values at said rotation and translation values.

5. A method as in claim 1, wherein each stained region is stained to show different features.

6. A method as in claim 1, further comprising finding an area of overlap between stained portions of the stained regions.

7. A method as in claim 1, further comprising finding a median between stained portions of the stained regions.

8. A method, comprising:
slicing a bulk sample to form multiple sections from the bulk sample;
staining plural samples from the bulk sample using difference stains, and maintaining one of said samples as unstained, wherein the unstained section is in-between the stained sections;
obtaining plural different images from said stained samples and said unstained samples,
using a computer to orient the images so that similar parts of the images are in similar locations;
using the computer to find an area of overlap between the images; and
using a computer to produce output information that can be used to carry out laser microdissection on the unstained sample, based on information obtained from the stained sample.

9. A method as in claim 8, wherein said output information is output to a laser microdissection tool.

* * * * *